United States Patent [19]
Daniels, Jr. et al.

[11] Patent Number: 5,797,015
[45] Date of Patent: Aug. 18, 1998

[54] METHOD OF CUSTOMIZING APPLICATION SOFTWARE IN INSERTER SYSTEMS

[75] Inventors: Edward P. Daniels, Jr., Trumbull; Clare E. Woodman, Norwalk, both of Conn.

[73] Assignee: Pitney Bowes Inc., Stamford, Conn.

[21] Appl. No.: 424,747

[22] Filed: Apr. 18, 1995

[51] Int. Cl.⁶ ................................................ G06F 9/40
[52] U.S. Cl. ..................... 395/712; 395/685; 395/701; 395/651; 364/963.3
[58] Field of Search ........................... 395/650, 700, 395/652, 670, 671, 710, 711, 712, 702, 703, 704, 685, 651; 364/963.3, 975.4, 281.3, 280.9, 281.8; 209/509, 900

[56] References Cited

U.S. PATENT DOCUMENTS

| | | | |
|---|---|---|---|
| 5,247,678 | 9/1993 | Littleton | 395/700 |
| 5,247,681 | 9/1993 | Janis et al. | 395/700 |
| 5,291,601 | 3/1994 | Sands | 395/700 |
| 5,303,379 | 4/1994 | Khoyi et al. | 395/700 |
| 5,359,721 | 10/1994 | Kempf et al. | 395/425 |
| 5,475,840 | 12/1995 | Nelson et al. | 395/700 |

FOREIGN PATENT DOCUMENTS 0426909 11/1989 European Pat. Off.
WO94/11881 5/1994 WIPO.

*Primary Examiner*—Emanuel Todd Voeltz
*Assistant Examiner*—Michael T. Richey
*Attorney, Agent, or Firm*—Christopher J. Capelli; Melvin J. Scolnick; Robert Meyer

[57] ABSTRACT

A method of customizing application software in an inserting system includes the steps of providing a system baseline program for operating the inserting system in a standard baseline mode, and providing a dynamic link library (DLL) including a table of features to be included in the inserting system and an application routine corresponding to each of the features. A call table in the system baseline program is linked with an address for each feature corresponding to the location of the application program for the feature. The DLL is customized based on information received from the baseline program. Each of the features is called when indicated in the system baseline program and information is provided to each DLL application program corresponding to the feature. The information is modified to make the system baseline program execute a different set of logic corresponding the customization of the machine. A sub-dynamic link library (sub-DLL) is provided for further customization. The sub-DLL includes a table of sub-features to be included in the inserting system and an application sub-routine corresponding to each of the sub-features. The sub-DLL is similarly integrated with the DLL and called by the DLL routines.

2 Claims, 6 Drawing Sheets

FIG. 4

| | |
|---|---|
| LIBRARY | CUSTOMDB |
| EXETYPE | WINDOWS |
| CODE | PRELOAD FIXED |
| DATA | PRELOAD SINGLE |
| HEAPSIZE | 1024 |
| EXPORTS | |

| | | |
|---|---|---|
| WEP | @1 | RESIDENTNAME |
| _UpdateCollection | @2 | |
| _UpdateUserRunStart | @3 | |
| _GetBankID | @4 | |
| _UpdateUserRunEnd | @5 | |
| Pack | @6 | |
| LoadDB | @7 | |
| _UpdateScanError | @8 | |
| _UpdateInit | @9 | |
| _InitStopTimes | @10 | |
| _UpdateUserRunLogin | @11 | |
| _UpdateUserRunOMS | @12 | |
| _ResetOMSTable | @13 | |
| GetMachname | @14 | |
| _CompareAccountNumber | @15 | |
| _InitErrorCapture | @16 | |
| _UpdateErrors | @17 | |
| _GetMeterUserRunID | @18 | |

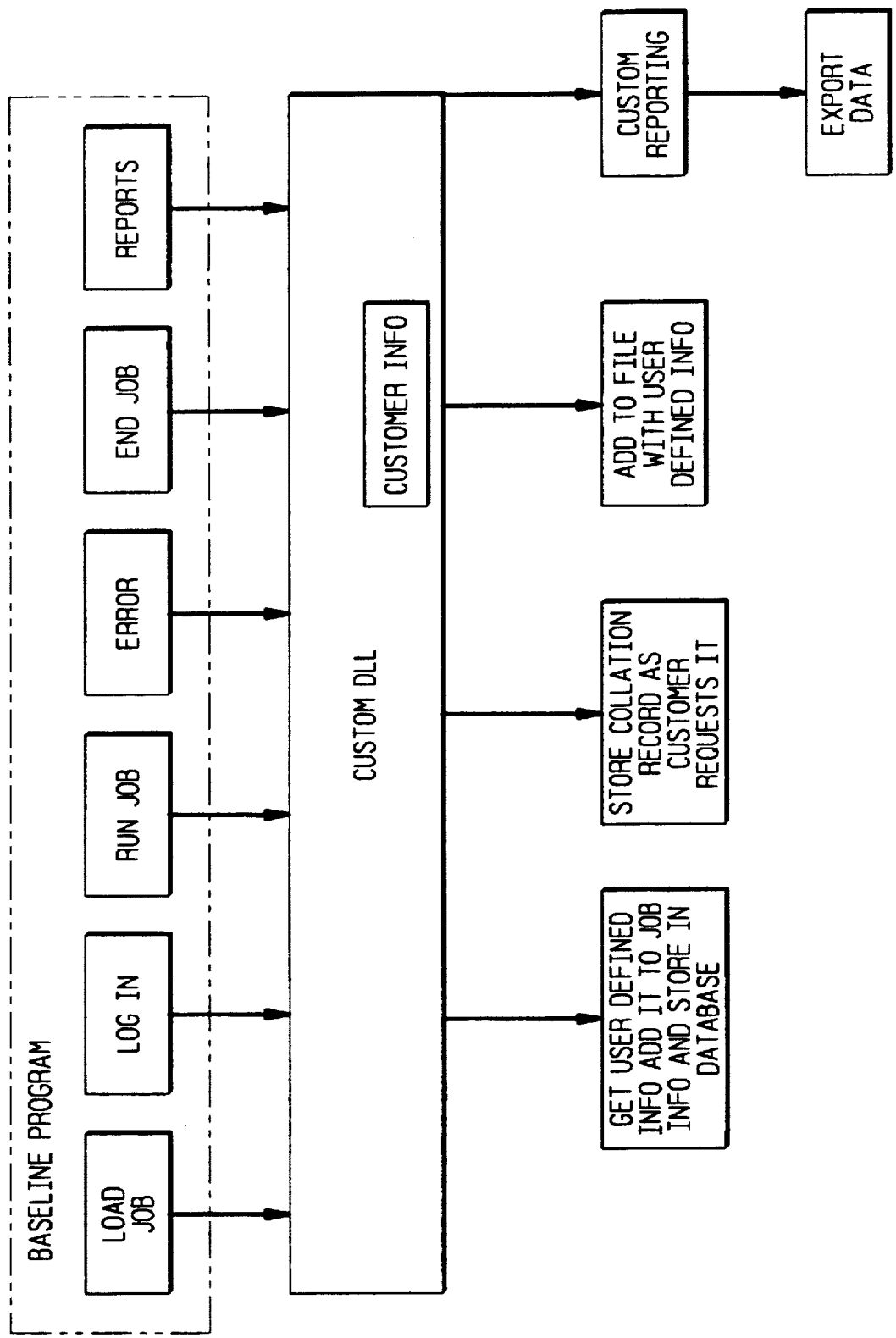

METHOD OF CUSTOMIZING APPLICATION SOFTWARE IN INSERTER SYSTEMS

FIELD OF THE INVENTION

The present invention relates generally to a method of customizing the software controlling a machine and, more particularly, to a method of customizing the software controlling inserting machines.

BACKGROUND OF THE INVENTION

There are three types of software controlled machines. Standard off-the-shelf machines comprise identical hardware and software for specific revision levels and software releases. Such machines are intended for sale in large quantities at each revision level. A custom built machine is a machine that is generally built once or, if more than once, is built for one customer. The custom built machine is intended for use for a unique purpose that is usually associated with a particular customer. The third type of software controlled machine is a hybrid of the off-the-shelf and custom built machines and is generally referred to as a customized machine.

A customized machine generally includes a core hardware and software design that the manufacturer modifies to meet the requirements of each customer. Such machines are typically sold in quantities greater than a custom built machine, but less that off-the-shelf machines. The time for manufacturing a customized machine is generally greater than for an off-the-shelf machine, but less than for a custom built machine. Typically, the greater the amount of customization, the longer the manufacture time which includes testing and debugging of the control and application software.

Console inserters, such as the Pitney Bowes 9 Series™ Inserting System manufactured by the assignee of the present invention, are large mail processing machines that are configured to meet the specific requirements of each customer. Since each customer generally has requirement that differ from other customers, manufacturers of such inserters must customized each inserter to meet each customer's requirements.

Heretofore, the customizing of inserting systems has typically required customizing the control software so that the inserting systems meet the specific requirements of the customer. This is an inherent problem experienced in the manufacture of customized machines, such as inserting systems, because whenever changes are made to the control software, the entire machine and control software must be tested to verify that the performance of the machine has not regressed as a result of the changes. Depending on the nature of the change, such regression testing may be quite extensive. The extent of the impact on the manufacturing process is proportional to the amount of customization of the control software. Although inserting systems are considered customized machines, customer requirements in recent years have expanded to the point that the control software has resembled custom software more than customized software.

Another problem experienced with the customizing of the control software of the inserters is the plurality of versions of the control software in the field. Even though the inserting systems in the field are performing basically the same inserting functions, the control software of each inserting system differs in some respect from the control software of the others based on the customized features in each inserter. One way manufacturers have controlled this problem has been to limit the applications available to customers. However, in today's a competitive market, this is no longer a practical solution.

A more practical solution to the problem of adding applications for a particular customer has been to include the applications through an additional computer and user interface that is separate from the main computer and interface of the machine. Although this solution reduces the need for modifying the control software of the machine, it adds significant cost to the machine which is undesirable in a competitive market.

Since each customer has its own unique applications with regard to information input to and output from an inserting system, the customers, and in particular customers employing large production mail facilities, want inserting systems having features that meet their unique requirements, but which are delivered fully tested and fully supported after delivery. The manufacturer wants to deliver a reliable system to its customers that provides them with the customized features that they require. However, such desires are difficult to achieve when each inserting system more resembles a custom system than a customized system because the customization occurs in the control program.

SUMMARY OF THE INVENTION

It has been found that the present invention provides a method of customizing the software controlling a machine with customer specific features without the need to perform regression testing to the standard software of the machine. In accordance with the present invention a baseline program controls the machine in a standard baseline mode and a dynamic link library is used to integrate customer specific applications into the machine. It has been found that the present invention provides a more reliable machine that is easier to manufacture, test and modify with regard to such customer specific features.

In accordance with the present invention, a method of customizing application software in an inserting system includes the steps of providing a system baseline program for operating the inserting system in a standard baseline mode, and providing a dynamic link library (DLL) including a call table of features to be included in the inserting system and an application routine corresponding to each of the features. The call table in the system baseline program is linked with an address for each feature corresponding to the location of the application program for the feature. The DLL is customized based on information received from the baseline program. Each of the features is called when indicated in the system baseline program and information is provided to each DLL application program corresponding to the feature. The information is modified to make the system baseline program execute a different set of logic corresponding the customization of the machine. A sub-dynamic link library (sub-DLL) is provided for further customization. The sub-DLL includes a table of sub-features to be included in the inserting system and an application sub-routine corresponding to each of the sub-features. The sub-DLL is similarly integrated with the DLL and called by the DLL routines.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 4 is an example of a custom dynamic link library feature table with 18 features defined;

FIG. 5 is a block diagram of the operations by the system baseline program and the custom dynamic link library.

DETAILED DESCRIPTION OF THE INVENTION

Figure 1:
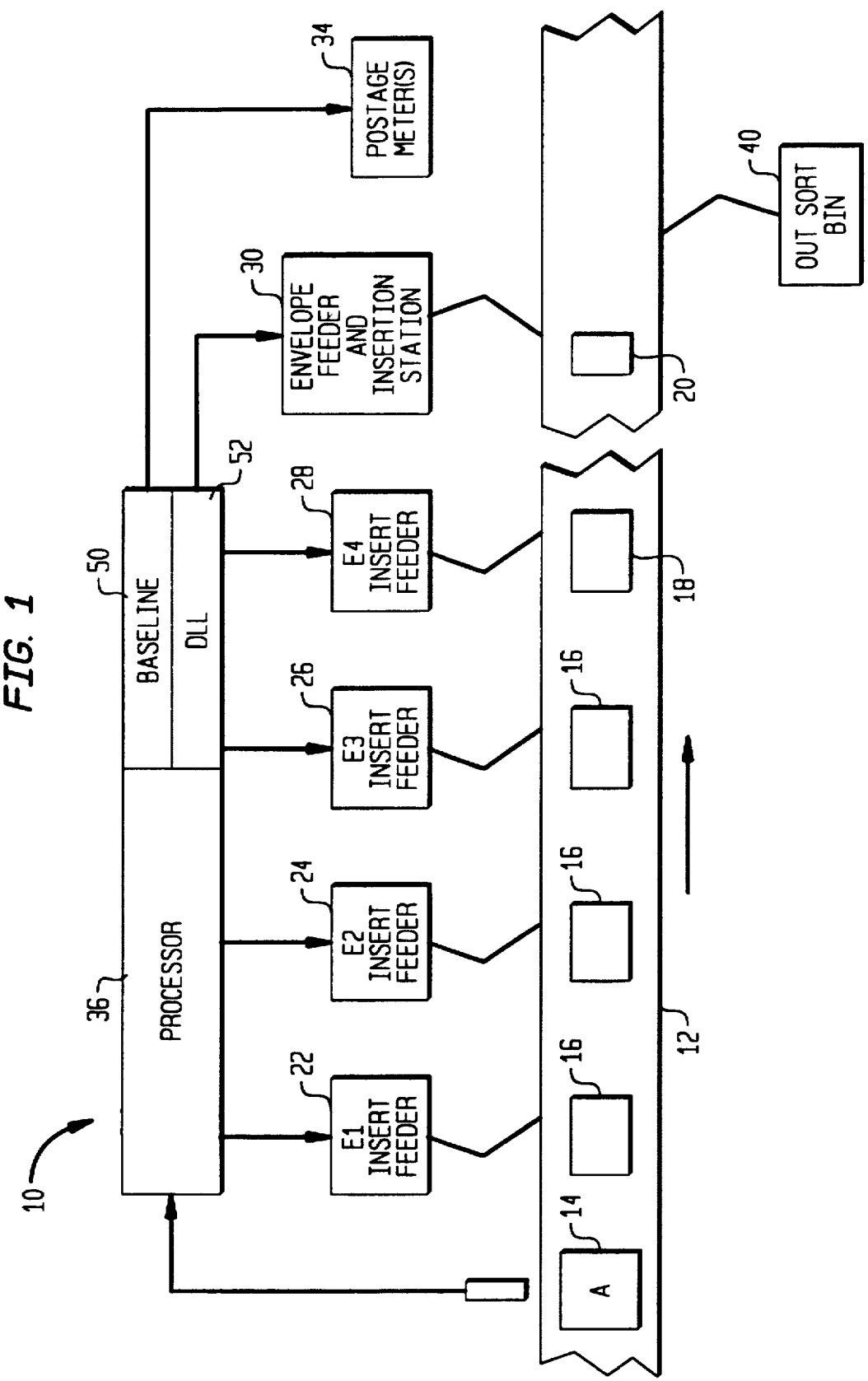
FIG. 1 is a block diagram of a software controlled inserting system.

In describing the present invention, reference is made to the drawings, wherein there is seen in FIG. 1 a block diagram of an inserting system, generally designated 10, that includes an embodiment of the present invention. Inserting system 10 operates to feed documents from a plurality of document feeders, including an upstream sheet feeder (not shown), insert feeders 22 through 28, onto a transport deck 12. The documents are accumulated into collations 16 which are conveyed downstream on deck 12 to an envelope feeder and insertion station 30 where final collations 18 of the documents are inserted into an envelope to form a mailpiece 20. Thereafter, mailpiece 20 either is sealed and conveyed to a postage meter 34 where a correct amount of postage is applied, or mailpiece 20 is outsorted to outsort bin 40. Inserting system 10, in this illustrative embodiment, is operable for reading an indicia provided on a control document (shown as part of collation 14 of required documents for a mailpiece) which is also conveyed upon deck 12, the indicia being indicative of control information relating to the mailpiece for the control document. Controlling the operation of inserting system 10 is a system processor 36. Processor 36 controls insert feeders 22 through 28 in response to the indicia and is also operable for determining the correct amount of postage for each stuffed envelope and for providing by suitable communication means the postage information to postage meter 34.

Figure 2:
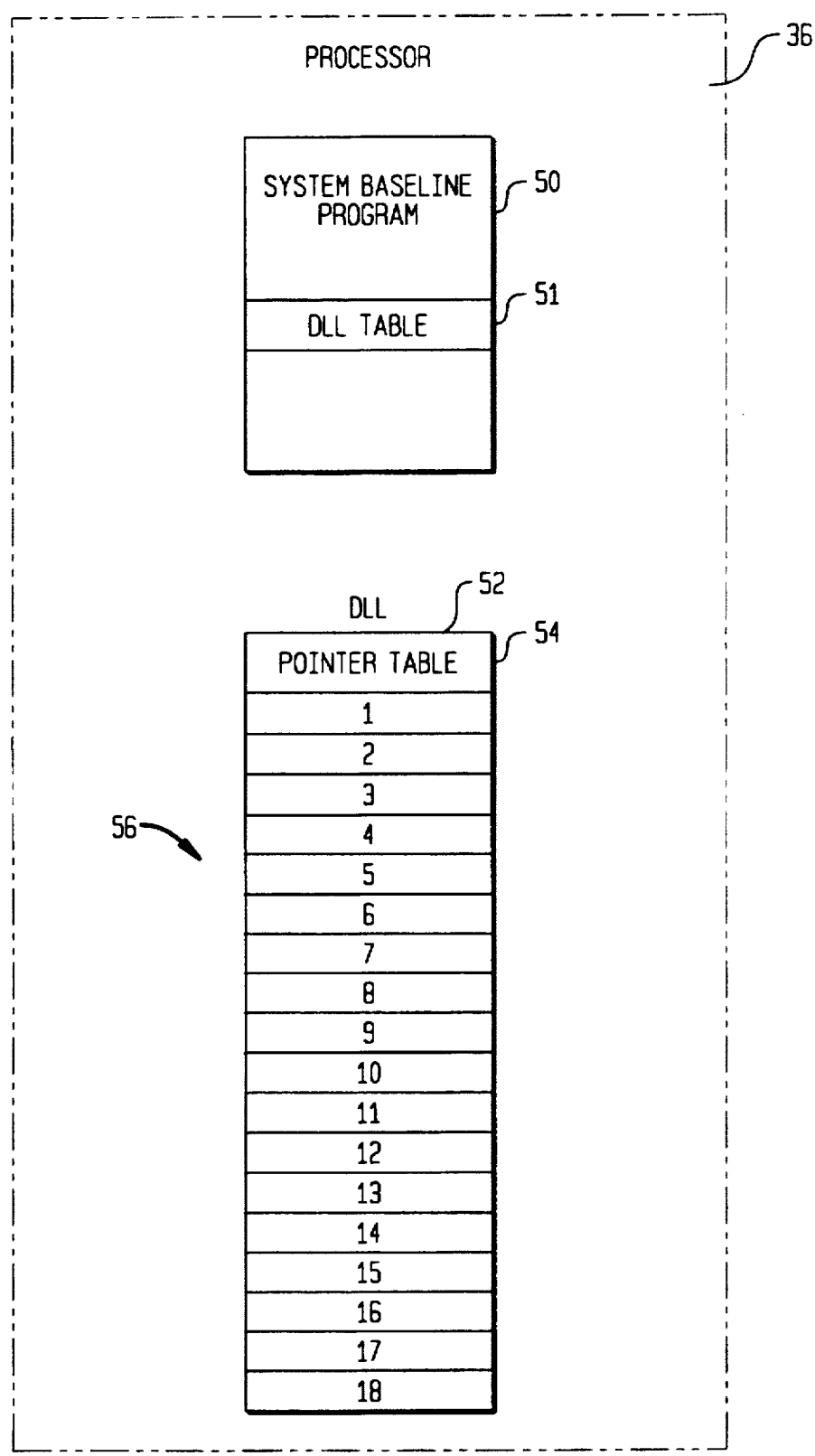
FIG. 2 is a block diagram of the software configuration of system processor including a system baseline program file and a custom dynamic link library file.

Referring now to FIG. 2, in accordance with the present invention the operating software of inserting system 10, i.e., the control software and the application software, is divided into two separate and independent files that are stored in system processor 36. The first file is off-the-shelf type software, referred to herein as the system baseline software 50, that is standard to the inserting system. The system baseline software 50 is configured within system processor 36 for operating inserting system 10 in a baseline mode that is standard to all inserting systems of the same product line. The system baseline software 50 is itself configurable according to the hardware configuration of the inserting system. The system baseline software 50 can be configured to operate an inserting system consisting of any combination of inserting system modules that are supported by the system baseline software.

The second file of the operating software comprises customizing software in the form of a dynamic link library (DLL) 52. The DLL includes a pointer table 54 containing addresses corresponding to the starting location of routines 56 for the various features or applications required for the inserting system by a particular customer. DLL 52, including pointer table 54 and feature routines 56, is configured as a file in system processor 36 that is separate from the system baseline software file 50. In the preferred embodiment, the DLL file 52 is a separate program running under Microsoft Windows™. DLL 52 is dynamically linked to the system baseline program at power up of the inserting system 10.

In accordance with the present invention, a standard version of the DLL comprising all expected application routines is the starting version for all inserting systems. The standard DLL is then modified by configuring the DLL pointer table 52 to provide the customized applications desired by the customer. Further customization of the DLL 52 is achieved by creating a sub-DLL 60 (FIG. 6) that is called by routines in the DLL. On-line customization of the inserting system occurs when the system is first initialized and a custom DLL routine is called. The customization routine, an example thereof is provided as Appendix A, takes information stored in a custom database table and manipulates the DLL routines to customize the DLL for a particular customer. Such customization is repeated every time the inserting system is powered up A standard DLL includes a complete set of routines 56 that correspond to all expected system requirements of customers relating to types of messages, data collection and machine sequencing and configuration. For each inserting system 10, the DLL pointer table 54 is configured to call routines 56 required for that particular inserting system. Thus, inserting system 10 can easily be customized to perform a feature desired by one customer that is not required in the same manner by another customer. For example, when a particular error occurs each customer may have its own way of processing the error. When a damaged mailpiece is detected one customer may just outsort the damaged mailpiece, but another customer may save a record of the mailpiece and store it in a database table so that the mailpiece can be regenerated later. The DLL routine corresponding to error processing would trigger any action to be taken by inserting system 10 for such damaged mailpiece.

In accordance with the present invention, mailpiece information relating to the status of the mailpieces processed on inserting system 10 is sent to DLL 52 when some, if not all, of routines 56 are called. The DLL routines that use such mailpiece information operate according to the information, modify the information and return it to the system baseline program, and/or store the information for later use. The information can be stored in DLL 52 in a format, e.g., flat text or dBase IV, that is compatible to the customer's off-line system.

Another example of a customer desired feature that is made practical by the present invention is error detection, logging and processing. Customers are generally interested in productivity and want to know when an error occurs, what caused the error and how long it took to correct the error. From this information, customers keep track of how efficiently operators respond to and correct problems in the inserting system. Such error logging and processing routines are incorporated into the DLL.

Another customizing feature is outsorting based on certain customer defined conditions. For example, when control code is scanned, generally the scanned information includes an account number. The DLL can be programmed to trigger an operation of the inserting system to outsort for particular account numbers. Typically, a list of account numbers to be outsorted can be loaded through an operator keyboard or by diskette into a table in the machine processor. Heretofore, this feature was performed by an extra processor of the inserting system.

The following paragraphs describe the initialization and operation of the DLL.

Figure 3:
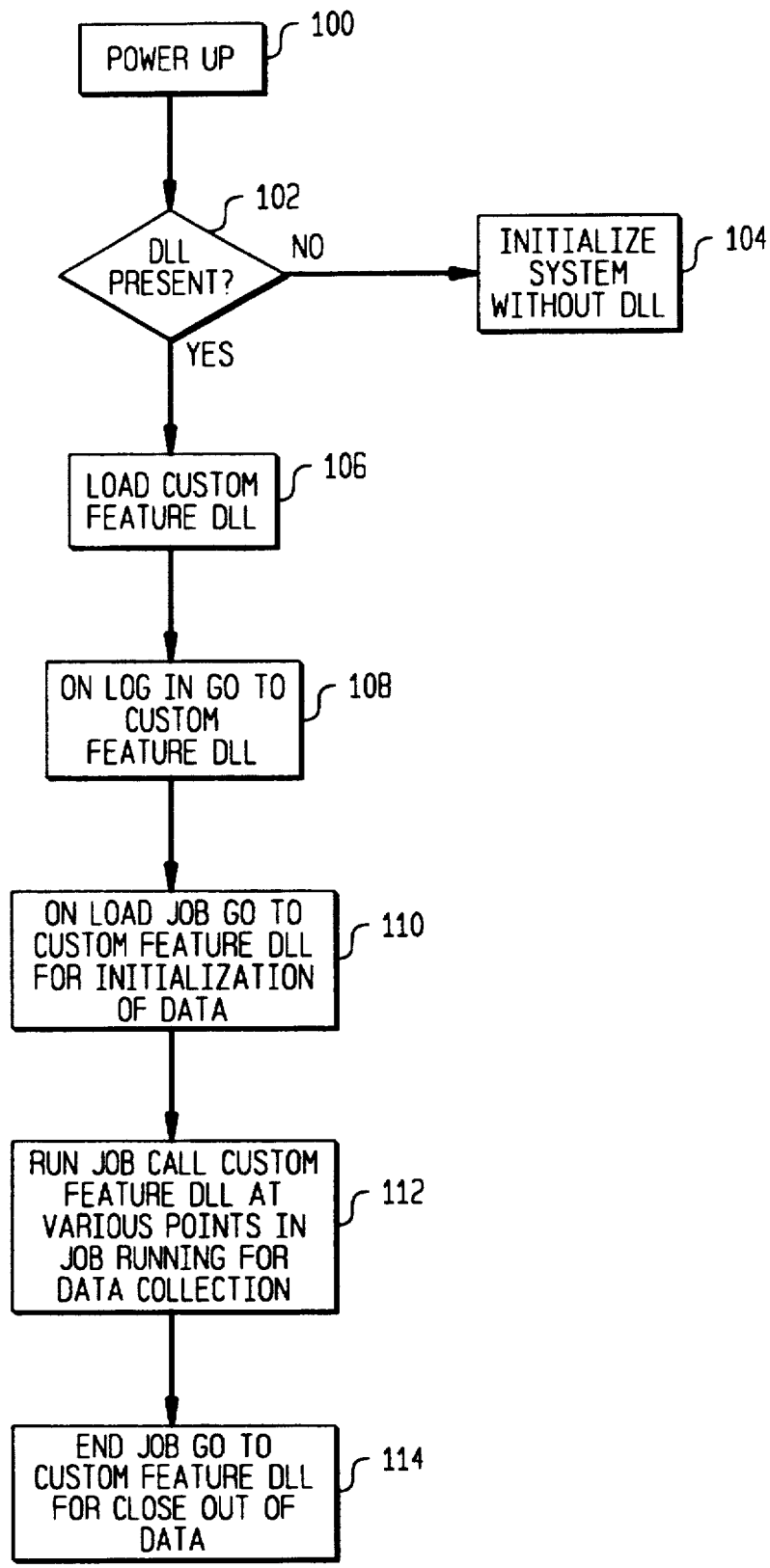
FIG. 3 is a flow chart of the custom dynamic link library calls by the system baseline program.

Referring now to FIG. 3, the system baseline program 50 is loaded at system power up, at 100. At 102, the system baseline program 50 determines if a DLL 52 is present. If present, the DLL loads its table of function pointers into an array in the system baseline program 50. The functions are listed in the table in a predefined order corresponding to the order expected by the system baseline program. Any function that is not active for a particular inserting system is represented by a null function pointer that indicates to the baseline program that the function does not exist. When the baseline program calls a particular DLL function, the pointer for that function is checked. If the pointer is a null, the function in the DLL is not called.

The majority of system baseline program 50 calls to routines in the DLL 52 include a pointer to certain information. The called DLL routine either uses the information as is, customizes it according to the customers requirements, or modifies the information and returns it to the system baseline program which then performs according to the returned information. For example, standard mailpiece information can be sent to a DLL routine and the DLL routine can return information, such as an outsort command, which the baseline routine would then act on itself or pass to another DLL in a later call. Thus, not only can the DLL extract information from the system baseline program and store the data in a form that the customer wants to see, the DLL can effect the processing of the mailpiece based on information returned to the system baseline program.

Heretofore, features, such as outsorting mailpieces corresponding to certain account numbers, was not practical because it would have required changes to the control program. Such changes would have resulted in a customized machine being more like a custom machine.

Referring now to FIG. 4, a table of DLL functions is shown. The table comprises a list of 18 DLL functions. At step 106, the system baseline program 50 looks for a DLL program file (CUSTOMDB). If it is not present, the system baseline program 50 loads all nulls into the DLL table 51. When there are no functions in table 51, this indicates to the system baseline program that no DLL is present and the inserting system is initialized at 104 (FIG. 3) to a baseline mode which effectively is an off-the-shelf version of the inserting system.

If the system baseline program 50 finds the DLL program file 52, the system baseline program loads the addresses in the DLL pointer table 54 into the DLL table 51. When the system baseline program 50 is ready to call a particular feature, the call is made through the DLL table 51 in the baseline program. If the table location for the feature is a null, the feature is skipped, i.e., the routine in the DLL is not called because the feature is not available on this inserting system. If there is a DLL, the addresses of the routine of the respective features are loaded into respective locations of the DLL table 51.

Referring again to FIG. 3, at 106, the DLL pointers in table 54 are loaded into table 51 in the system baseline program 50. At 108, system baseline program 50 performs login to check to see if the custom DLL function is loaded in table 51. The login function initializes the custom features of inserting system 10 in DLL 52. At this point the inserting system is customized and ready for running. At 110, a load job function is performed wherein job information is sent with the DLL function call. At 112, the system baseline program runs the job calling DLL routines 56 at various points in the system baseline program 50. When the system baseline program 50 reaches a point in the program where a DLL feature is called, the address in the DLL table 51 corresponding to the feature is used in a conventional indirect call of the feature routine.

At 114, an end of job DLL function is called that takes all information and puts it in a format that is desired by the customer's system and either downloads the information to the customer's computer or stores the information to a diskette for off-line processing. In this manner, the DLL customizes information for customer's reports using information obtained from the system baseline program. In the preferred embodiment of the present invention, the system baseline program 50 includes standard report information that is modified by DLL 52 for the customer's customized reports.

Customized information includes any information that alters the processing of a mailpiece that differs from the standard operating information of the system baseline program 50. The DLL 52 manipulates the processing of the mailpieces by processing the information received from the system baseline program 50 in accordance with the customized features of the customer. There are no limits as to what the DLL 52 can store, look at or act on with regard to the system information. Heretofore, such processing was limited because much of the information was not available since it was not practical to modify the control program to accomplish such features.

There are three ways the DLL 52 obtains information that it needs for the routines called. First, the DLL generates the information itself, e.g. self-contained information that the DLL keeps maintains every time it is called. Second, the DLL 52 obtains information directly from the system baseline program 50 when it is called. When the DLL 52 obtains such information, the DLL extracts the information it needs, reformats the information and then stores the information. Third, the system baseline 50 program passes to the DLL 52 a pointer to where the information is stored in the system baseline program. The DLL does not extract such information but may add to it. DLL routines may use one or some combination of the above methods for obtaining information. In the preferred embodiment, there is no dynamic exchange of information through memory, the DLL function has to be called by the system baseline program 50 to obtain information for the DLL routine called.

The key to the present invention is creating a system baseline program that is standard to all inserting systems and that includes the generic features of an inserter. Once this has been created, the DLL 52 is created using customized feature calls in the system baseline program 50. The calls are hooks positioned, based on experience, within the system baseline program where customizing features should be called. If the system baseline program 50 is updated with additional hooks or feature calls, the updated system baseline program would be released as a new revision level of the standard system baseline program.

Figure 6:
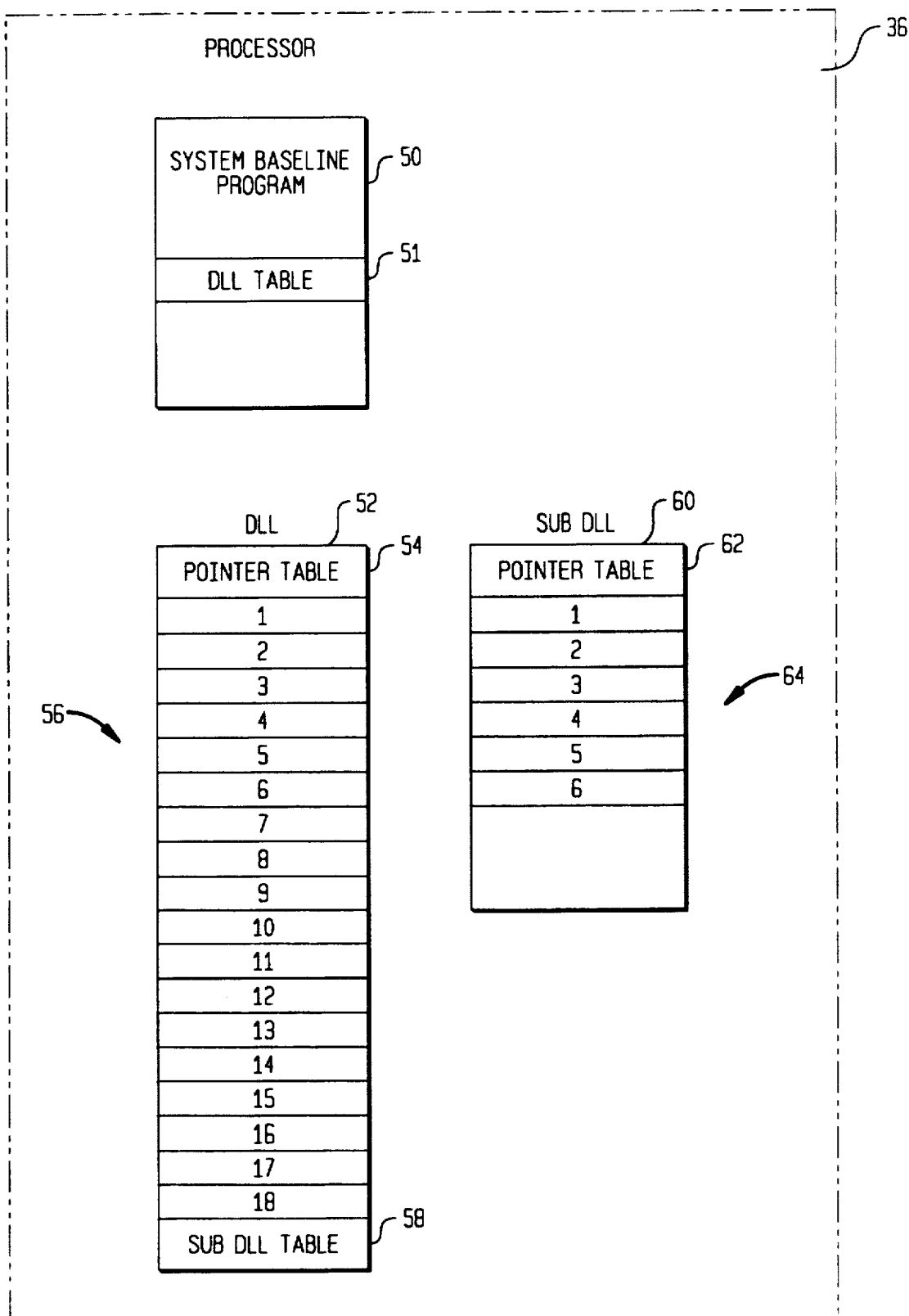
FIG. 6 is a block diagram of the system processor similar to FIG. 2 but including sub-DLL files.

Referring now to FIG. 6, a sub-DLL 60 is used for introducing another level of customizing of the inserting system. Sub-DLL 60 includes a pointer table 62 containing addresses corresponding to the starting location of sub-routines 64 for the various features or applications required for the inserting system by a particular customer. Sub-DLL 60 is a separate program running under Microsoft Windows™. Sub-DLL 60 is dynamically linked to DLL 52 at power up of the inserting system 10. The sub-DLL 60 is initialized and called by the DLL 52 in the same manner as the DLL 52 is initialized and called by system baseline program 50. The sub-DLL pointer table 62 is copied into the sub-DLL table 58 located in the DLL. Sub routines 64 are called by DLL routines 56 using sub-DLL pointer table 62.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A method of customizing application software in an inserting system, comprising the steps of:

providing a system baseline program for operating the inserting system in a standard baseline mode;

providing a dynamic link library (DLL) including a table of features to be included in the inserting system and an application routine corresponding to each of the features;

integrating into a call table in the system baseline program an address for each feature corresponding to the location of the application program for the feature;

customizing the DLL based on information received from the baseline program;

calling each of the features when indicated in the system baseline program;

providing information to each DLL application program corresponding to the feature;

modifying the information to make the system baseline program execute a different set of logic corresponding the customization of the machine.

2. A method of customizing application software in an inserting system, comprising the steps of:

providing a system baseline program for operating the inserting system in a standard baseline mode;

providing a dynamic link library (DLL) including a table of features to be included in the inserting system and an application routine corresponding to each of the features;

integrating into a call table in the system baseline program an address for each feature corresponding to the location of the application program for the feature;

customizing the DLL based on information received from the baseline program;

calling each of the features when indicated in the system baseline program;

modifying the information to make the system baseline program execute a different set of logic corresponding the customization of the machine;

providing a sub-dynamic link library (sub-DLL) including a table of sub-features to be included in the inserting system and an application sub-routine corresponding to each of the sub-features;

integrating into a sub-DLL call table in the DLL an address for each sub-feature corresponding to the location of the DLL routine for the sub-feature;

customizing the sub-DLL based on information received from the DLL;

calling each of the sub-features when indicated in the DLL;

providing information to each sub-DLL sub-routine corresponding to the sub-feature;

modifying the information to make the DLL execute a different set of logic corresponding the customization of the inserting system.

* * * * *